Patented July 29, 1952

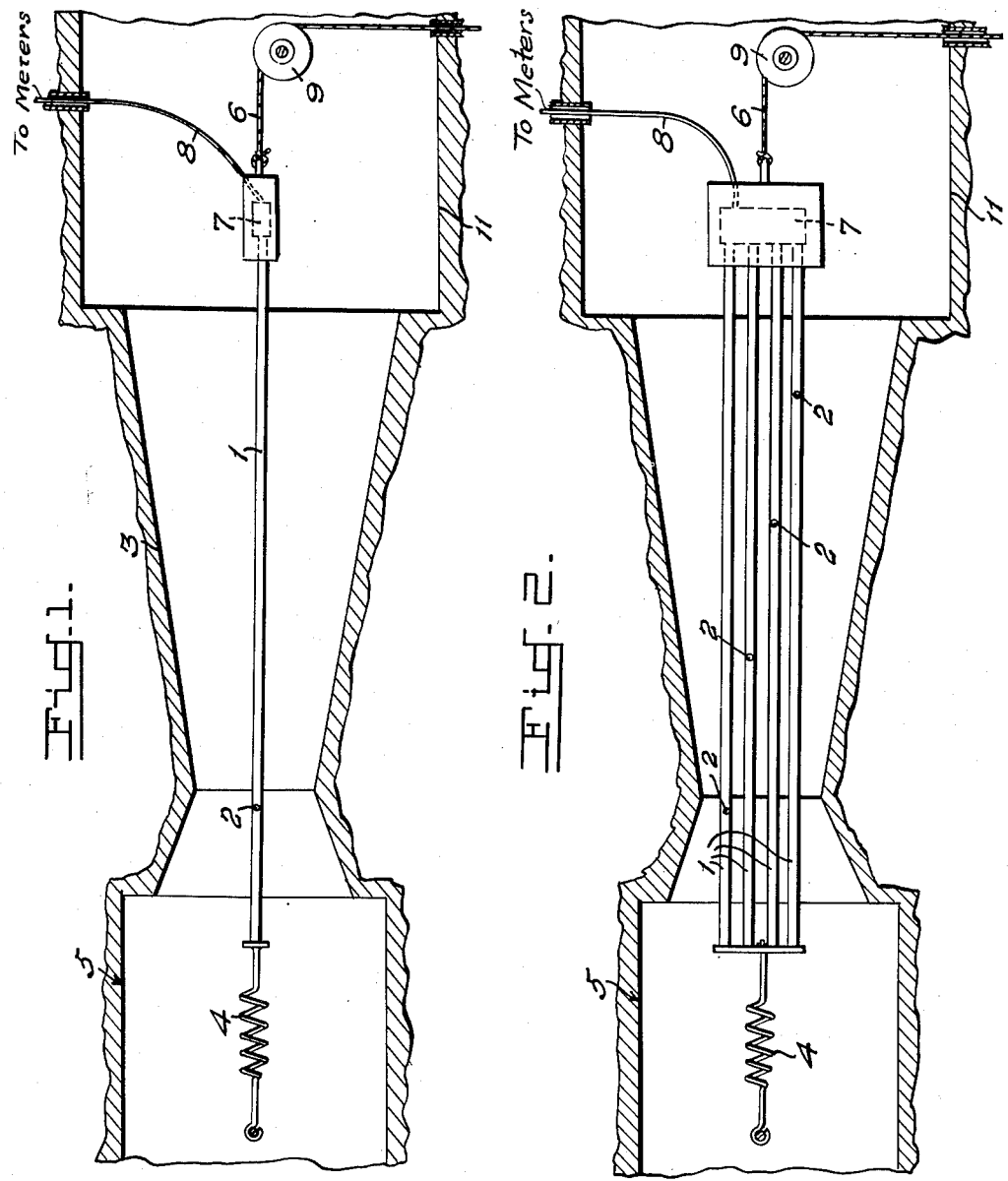

2,604,786

UNITED STATES PATENT OFFICE 2,604,786

STATIC PRESSURE INVESTIGATOR

Dieter K. Huzel, Fort Bliss, Tex., assignor to the United States of America as represented by the Secretary of the Army Application June 9, 1950, Serial No. 167,241

4 Claims. (Cl. 73—388)

(Granted under the act of March 3, 1883, as amended April 30, 1928; 370 O. G. 757)

The invention described in the specification and claims may be manufactured and used by or for the Government for governmental purposes without the payment to me of any royalty thereon.

This invention relates generally to measuring instruments, and in particular to a means for measuring the static pressure within a diffuser, or duct of varying cross section designed to convert a high speed air flow into lower speed flow at an increased pressure. It will be understood, however, that the invention is adaptable for use in measuring and testing procedures in any duct.

Investigations of the distribution of static pressures in diffusers or ducts are presently carried out by means of test holes in the side walls with gauges attached thereto, or by means of probes inserted into the diffuser. In order to insure mechanical stability when probes are employed they must be increasingly bulky as the length of immersion increases, extensive and complex equipment is called for, and considerable boundary effects are encountered.

By the use of my invention it is possible to use simple, well known components and gauges and to eliminate the complicated equipment inherent in other methods. My invention further provides a convenient way to explore the entire longitudinal length of the diffuser or duct from within and to thereby determine exactly where the points of maximum or minimum pressure are located.

My invention contemplates the use of a thin tube suspended and movable in or parallel to the longitudinal axis of the duct under test, said tube having a hole in the side wall thereof and connected to a pressure pick-up means whereby conditions of static pressure may be indicated or recorded.

It is an object of my invention to provide novel structure for measuring static pressure within a duct or other enclosed volume.

It is a further object of my invention to provide apparatus for indicating and investigating static pressure which will eliminate the mechanical difficulties inherent in conventional testing means.

It is a still further object of my invention to employ a thin tube suspended within an enclosed volume to investigate the conditions of static pressure existent therein.

Fig. 1 is an elevation in section of a diffuser or duct of varying cross section in accordance with my invention.

Fig. 2 is an elevation in section showing a modification of the invention of Fig. 1.

Referring to Fig. 1, a thin tube or tubule 1 closed at one end is suspended in or parallel to the longitudinal axis of a diffuser 3 which is to be investigated. In order to allow the static pressure to be applied to pressure responsive means 7 a hole 2 is provided in the tubule wall.

Since the tubule is thin (in practice it is usual to use tubules of less than $\frac{1}{32}$" diameter) and lacks the mechanical strength necessary to support itself it is attached at one end to a spring 4 and at the other to a pressure pick-up means 7 of any well known form. A wire rope 6 is secured to the pick-up means and passes over a pulley 9 to the outside of reservoir 11. It should be noted that the spring 4, its support and the pressure pick-up are located in the reservoirs 5 and 11 whereby the free flow of air within the diffuser per se is unaffected.

Any well known type of pressure pick-up may be used. It has been found in practice however that either the hot-wire pressure gauge or the piezoelectric pressure gauge are suitable for this application. The hot-wire pressure gauge has a bridge type circuit with two resistance elements heated by an electric current. One of the elements can be connected by wires and exposed to the air under pressure in pick-up means 7, and the other element is exposed to atmospheric pressure. Any change in the density of the air surrounding the element under pressure will result in a change in the rate of heat conductivity from the element and will in turn change the temperature of the element, and consequently unbalance the bridge circuit. The amount of change in resistance will be proportional to the change in pressure and the instrument is calibrated directly in pressure units.

The piezoelectric pressure gauge when used requires a quartz crystal as the pressure sensitive element in pressure responsive pick-up means 7. It is well known that the current generated by the application of pressure to a crystal is proportional to the applied pressure. The current may be transmitted through wires to suitable electronic amplifiers and meters whereby a direct reading is made.

The longitudinal position of the tubule 1 may be changed within the diffuser by pulling on the wire rope 6 which extends outside the reservoir 11. This is a quick and convenient way to explore pressures from point to point within the device. The spring 4 will serve to bias the tubule so that it will return to its original position upon the release of rope 6.

A modification of the diffuser investigator is shown in Fig. 2. Here there are shown 4 tubules each of which has a hole 2 in its side wall. The locations of the holes are staggered with respect to each other so that an exploration of the pressures within the diffuser can be made with a minimum of movement of the assembly. Any number of tubules may be used and if desired the rope 6 may be connected to a suitable locator or calibrator which will automatically indicate the spacing of any or all of the holes from a reference point in the diffuser.

It should be noted that the placing of the pressure sensitive element within pick-up means 7 reduces time lag by having the element close to the point of applied pressure.

I have herein disclosed and described a simple, rugged, and reliable system for exploring the pressures within a diffuser which is inexpensive and easily handled in practice and which reduces boundary effects to a minimum.

The particular embodiment shown is for illustrative purposes only. Many modifications will readily suggest themselves to those skilled in the art and the invention is therefore not to be deemed as limited except within the scope of the appended claims.

I claim:

1. In a diffuser or the like a plurality of tubules closed at one end and having a hole in the side walls thereof, yielding means supporting the said tubules under stress parallel to the longitudinal axis of the said diffuser, said tubules movable in a direction parallel to the said longitudinal axis in response to tension applied in opposition to the urging of said yielding means, the said holes being so placed in said tubules that each lies in a different plane perpendicular to the said longitudinal axis, and a pressure responsive device attached to the other end of said tubules whereby static pressure conditions within the said diffuser can be explored.

2. In a diffuser or the like at least one tubule closed at one end and having a hole in the side wall thereof, and resiliently supported parallel to the longitudinal axis of said diffuser, said tubule movable in the direction of said axis by flexible means at least in part external to the said diffuser, and pressure pick up means attached to said tubule and movable therewith whereby the conditions of static pressure existent within said diffuser may be explored.

3. In a diffuser at least one tubule closed at one end and having a hole in the side wall thereof, means resiliently supporting said tubule parallel to the longitudinal axis of the said diffuser, said diffuser movable in a direction parallel to the said longitudinal axis by flexible means in part at least external to the said diffuser, and pressure pick up means at the other end of said tubule and movable therewith whereby the conditions of static pressure existent within said diffuser may be explored.

4. The invention as set out in claim 3 wherein the first mentioned means is a spring and the flexible means is a wire.

DIETER K. HUZEL.

REFERENCES CITED

The following references are of record in the file of this patent:

UNITED STATES PATENTS

| Number | Name | Date |
|---|---|---|
| 1,975,711 | Borden | Oct. 2, 1934 |
| 2,362,393 | Naida | Nov. 7, 1944 |
| 2,377,605 | Binckley | June 5, 1945 |

OTHER REFERENCES

"Simplex Type MO Meters," Bulletin #300, page 3, published by Simplex Valve & Meter Co., Philadelphia, Pa.